March 25, 1941.    M. QUAMMA    2,236,113
MEANS FOR PREPARING FOOD PRODUCTS
Filed Oct. 15, 1938    3 Sheets-Sheet 1

INVENTOR.
MARTIN QUAMMA
BY James M. Abbett
ATTORNEYS.

March 25, 1941.　　　M. QUAMMA　　　2,236,113
MEANS FOR PREPARING FOOD PRODUCTS
Filed Oct. 15, 1938　　　3 Sheets-Sheet 2

INVENTOR.
MARTIN QUAMMA
BY
ATTORNEYS.

March 25, 1941.  M. QUAMMA  2,236,113
MEANS FOR PREPARING FOOD PRODUCTS
Filed Oct. 15, 1938  3 Sheets-Sheet 3
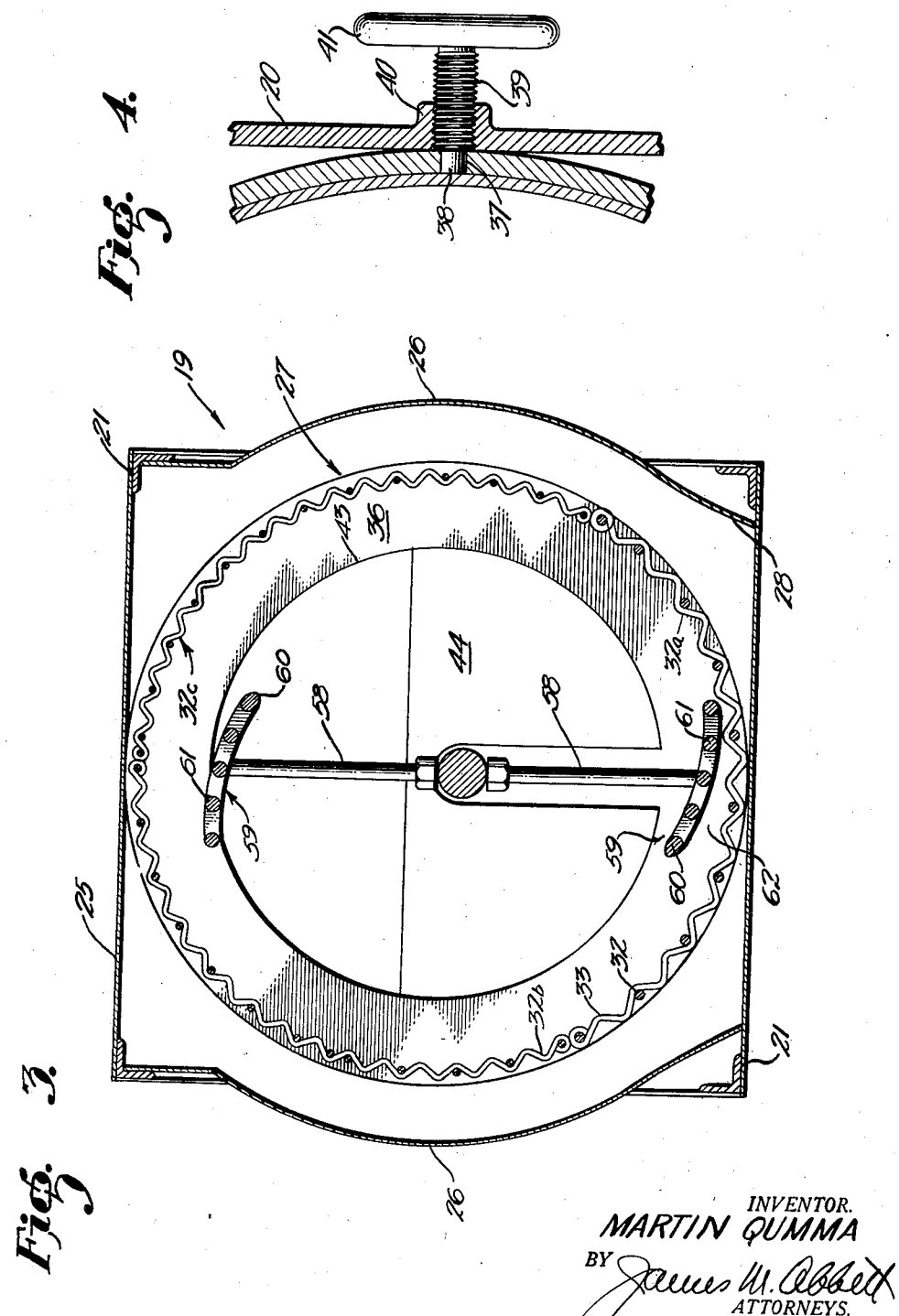
INVENTOR.
MARTIN QUMMA
BY
ATTORNEYS.

Patented Mar. 25, 1941

2,236,113

UNITED STATES PATENT OFFICE 2,236,113

MEANS FOR PREPARING FOOD PRODUCTS

Martin Quamma, San Diego, Calif., assignor to Van Camp Sea Food Co., Inc., Terminal Island, Calif., a corporation of California Application October 15, 1938, Serial No. 235,209

7 Claims. (Cl. 146—177)

This invention relates to a means for preparing food products.

In the preparation of various food products it is desirable to reduce the product to a relatively finely divided state without altering the condition of the product in a manner which might cause the product to deteriorate or become unmarketable after it had been packed or canned. This is particularly true in handling fish, such as tuna, for fish is of a fibrous character and tuna must be cooked before being canned, and at the present time must be broken into pieces and handled by hand in the packing operation. Various attempts have been made to break tuna into small pieces or to cut or shred it by mechanical means, and it has been found that in such operations the tuna will compress and pack and will become in the state of putty so that it cannot be satisfactorily packed or handled.

It is the principal object of the present invention, therefore, to provide means for treating tuna and like products whereby the product may be shredded to a desirable degree of fineness while leaving the tuna in the same natural condition in which it has been cooked and which makes it possible for the tuna to be fed into cans by an automatic mechanical operation and to be readily packed, thus insuring that a highly desirable commercial product will be obtained while reducing the packing and canning cost of the product, and while providing a new type of canned tuna or the like especially desirable for use in the making of salads.

The present invention contemplates the provision of means for treating relatively large pieces of cooked tuna and the like whereby the tuna will be shredded to a desired degree of fineness and fed from the machine for purposes of canning, the fibre of the tuna being broken apart without the use of cutting or grinding means, whereby the tuna fibres will be prepared in a "loose" condition for the purposes required.

The invention is illustrated by way of example in the accompanying drawings, in which:

Fig. 4 is an enlarged fragmentary view as seen on the line 4—4 of Fig. 2 and discloses an adjusting element.

Fig. 5 is an enlarged fragmentary view in section as seen on the line 5—5 of Fig. 3 and discloses a detail of construction of the shredding drum.

Figure 1:
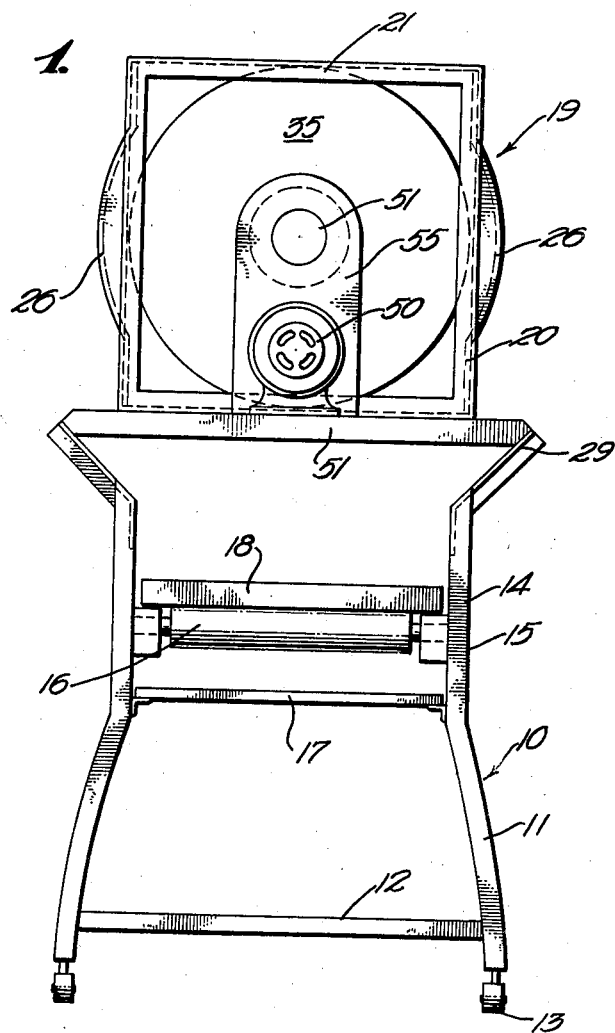
Figure 1 is a view in end elevation showing the apparatus with which the present invention is concerned.

Referring more particularly to the drawings, 10 indicates a base structure comprising suitable supporting legs 11 which may be tied together at the lower end by cross members 12 and supported by casters 13. Supported upon the legs 11 and forming a part of the sub-structure is a trough 14 having parallel vertical side walls between which suitable brackets 15 are mounted to carry a series of rollers 16 disposed in a longitudinal and horizontal plane. Removably mounted beneath the rollers are pans 17 into which scraps of the food product may fall when they accidentally pass over the edges of trays 18 which are moved horizontally over the rollers 16 and receive the shredded material, as hereinafter described.

Figure 2:
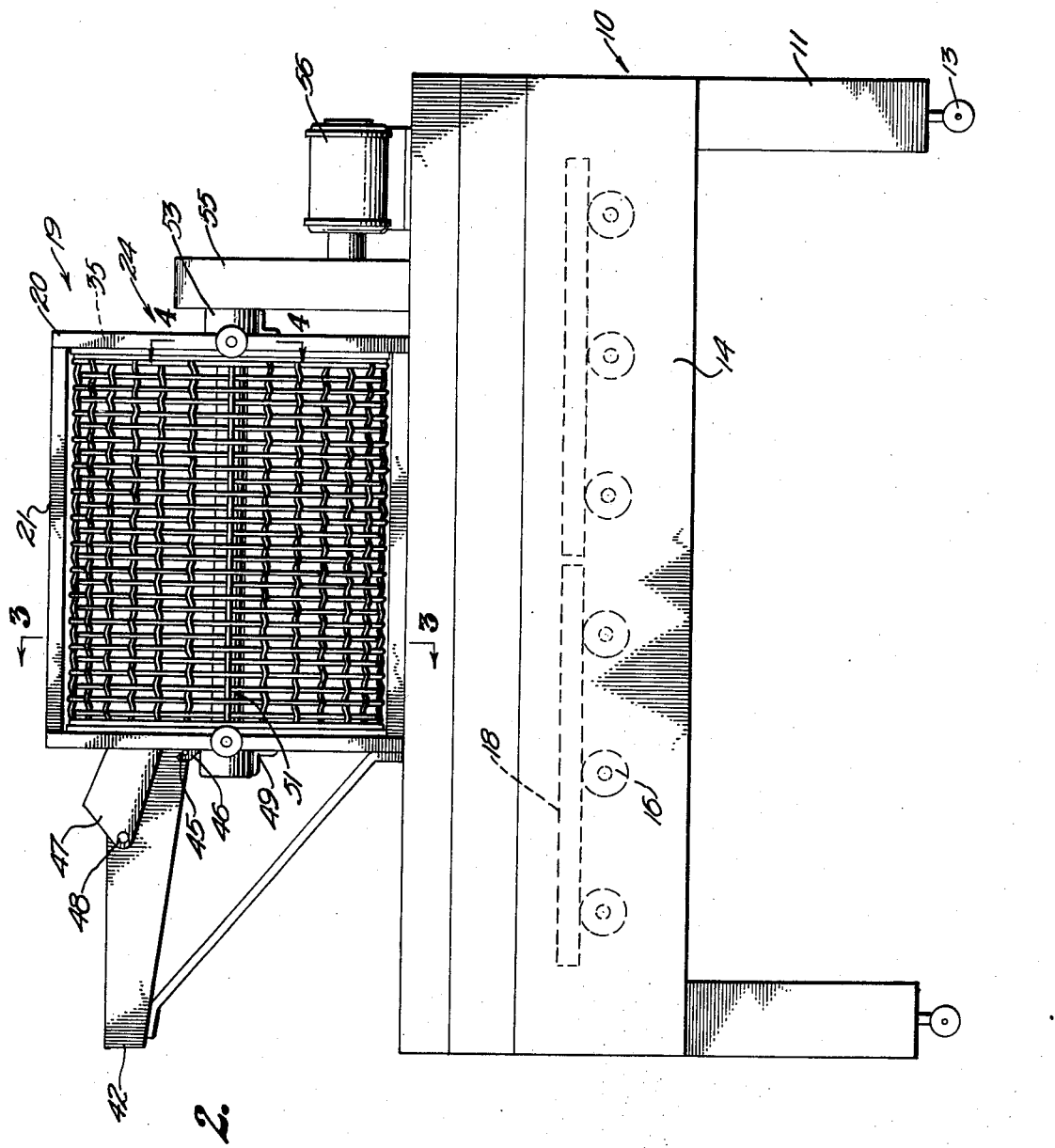
Fig. 2 is a view in side elevation showing the machine with which the present invention is concerned with the front side plate removed and with the shredding screen broken away for the sake of clearness.

Mounted upon the sub-structure 10 and at a point substantially midway the length thereof is a shredder unit 19. This unit comprises a frame structure having vertical corner posts 20 and horizontal and longitudinal corner members 21 by which a rectangular frame is produced. The elements forming the frame are preferably of angle shape and are fastened together so that the vertical corner posts 20 and transverse angle members 22 will provide a frame which is substantially square in shape and stands in a vertical plane. Two of such sections are indicated at 23 and 24 in Fig. 2 of the drawings.

Figure 3:
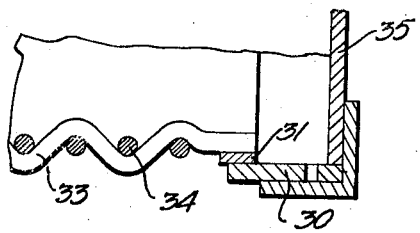
Fig. 3 is a view in transverse section through the machine as seen on the line 3—3 of Fig. 2 and discloses the details of the construction whereby the product is shredded without a crushing or grinding action.

The horizontal and longitudinal corner members 21 extend lengthwise to tie the upper corners of the frame units 23 and 24 together. They also provide a support for a cover plate 25 and an anchor for side plates 26 which extend downwardly and bow outwardly around a drum structure 27. The lower ends of the side plates have a skirt portion 28 which extends inwardly and forms a guide throat through which the finely shredded material may pass as it falls onto the trays 18. In order to prevent spilling of the material the side wall sections 14 of the sub-structure may have upwardly and outwardly flaring portions 29 thereon, as shown in Fig. 3 of the drawings. The end frame units 23 and 24 provide a support for the shredding drum 27. This drum, as shown in Figs. 3 and 5 of the drawings, comprises a pair of opposite end rims 30, which are circular in shape and which are of an outside diameter agreeing with the inside dimensions of the frame units 23 and 24 and into which units the rims extend, and by which units the rims are rotatably supported. Secured in the rims are mounting rings 31 to which reticulated side wall sections 32 are fastened. These side wall sections are preferably fastened by welding. The side wall sections are of great importance in producing a shredding operation with the present invention since they are formed with longitudinally extending wires 33 and transversely and circumferentially extending wires 34. The wires in both directions are formed with undulations, as shown particularly in Fig. 5 of the drawings, whereby a desirable shredding action is created.

In operation the drum 27 is relatively stationary. By reference to Fig. 3, however, it will be seen that the reticulated portion 32 is formed in three sections 32a, 32b and 32c, which are of different mesh. This makes it possible to produce different shredding actions by rotating the drum so that its lowermost section will be of a desired mesh, as indicated at 32a. Mounted within the opposite ends of the drum are end plates 35 and 36 which prevent the material from being discharged save through the mesh of the screens 32.

Holes 37 are formed through the rims 30 and receive the pointed ends 38 of screws 39. These screws are threaded through bosses 40 on the vertical elements 20 of the frame structure and are manipulated by suitable hand wheels 41 whereby the drum 27 may be rotated to place a desired section of screen in an operative position, after which the portion 38 of the screw may be brought to register with a perforation 37 in the rim to hold the drum against rotation.

The forward end of the frame structure 19 carries a feed trough 42 which leads through an opening 43 in the end plate 36. This opening receives a flange portion 44 acting as a downwardly extending apron and over which material falls onto the screen. The apron will also substantially close the lower portion of the opening 43. The spout structure 42 may be removed from its position since it is provided with pins 45 which extend laterally and are engaged by hooks 46 carried by the frame structure 19. A bonnet 47 is pivotally mounted at 48 to the spout 42 and also extends into the opening 43 to properly direct the material into the drum.

Mounted upon the frame unit 23 is a transverse frame element 49 which carries a bearing 50. The bearing 50 rotatably supports a horizontal shaft 51. The opposite end of the shaft extends through a bearing 53 carried by a frame element 54 mounted upon the frame unit 24. This end of the shaft extends into a gear box 55 where a suitable set of gearing is provided to place the shaft 51 in driving relationship to a motor 56. The motor 56 is mounted upon a transverse support 57 carried by the sub-frame 10.

Attention is directed to the fact, as particularly disclosed in Fig. 3 of the drawings, that the shaft 51 is disposed eccentrically of the central longitudinal axis of the shredding drum 27 and that the point of eccentricity of the shaft 51 is below the central axis of the drum 27 and in the same vertical plane therewith. The shaft carries a plurality of radial arms 58; two sets of these arms are here shown as being disposed in diametrically opposite directions and in the same plane. Each set of arms carries a shredding grid 59. Each shredding grid comprises a leading bar 60 and a plurality of trailing bars 61. The leading bar is substantially oval in section with its forward edge relatively narrow and round. The trailing bars may be circular in section. The various bars are spaced with relation to each other and lie along an arcuate plane, which is eccentric to both the axis of the drum 27 and the axis of the shaft 51. This causes an arcuate V-shaped throat 62 to occur between the inner circumferential plane of the reticulated wall 32 of the drum 27 and the outer arcuate plane, as represented by the elements of the grid structure 59, and due to the eccentricity between the centers of the drum 27 and the shaft 51 this throat will reduce in width as it swings over the lowermost portion of the reticulated wall 32 of the drum, as indicated in Fig. 3 of the drawings.

In operation of the present invention the structure is assembled as here shown. Attention is directed to the fact that the entire structure is so constructed as to make it possible for the cover 25, the sides 27 and the spout structure 42 to be completely removed so that the entire piece of apparatus may be cleaned, washed and sterilized and maintained in a condition to satisfy the sanitary laws of food and health departments. When the structure has been assembled ready for use the drum 27 is adjusted so that the desired screen 32 will be lowermost, after which the screw 38 is set to hold the drum in its required position. The motor 56 is then started and it will rotate the shaft 51 in the direction of the arrow a, as indicated in Fig. 3. Pieces of tuna which have been previously cooked, or other products which are to be shredded, are fed into the drum 27 through the spout 42 and are allowed to fall onto the lowermost portion of the drum. At this time the shredding grids 59 are moving along their arcuate paths of travel, and as they reach the lower sweep of their swing will progressively move toward the inner face of the reticulated section of the drum which is lowermost and will tend to close the throat 52 occurring between the grid and said face. It will be recognized that since the wires of the reticulated wall have undulations in both directions the inner surface presented to the material being shredded will be formed with a plurality of uniformly arranged and spaced protrusions, and that as the grids move toward and along this surface in their downward and forward sweep they will tend to brush the material forwardly which has been lodged in the throat 60. This action will drag the material over the protrusions and undulations of the reticulated wall 32 and will tend to tear the fibres of the material apart and will also act to break the fibres that point throughout their length. This will cause the fibres to be shredded both by separation of the fibres and by a severing action whereby a relatively fine shredded product will result.

Attention is also directed to the fact that due to this operation there is no tendency for the materials to pack but the materials are allowed to fall through the reticulated wall and into the trays 18 which are therebeneath. Atttention is also directed to the fact that any unshredded pieces of material may be carried by or in advance of the moving grids 59 as these grids pass upwardly and over their rotational center. At that time these pieces of material may become dislodged and fall onto the floor of the screen and into the path of the grids as they move. The impact of the fall will tend to diminish the coherence of the fibres of the material and will facilitate in subsequent shredding operations. It will also be evident that due to this arrangement materials which have caught upon the grids may become dislodged. In fact, in actual operation it has been proved that the spaces between the grids do not accumulate a mass of material but that the apparatus maintains itself in a clean and workable condition.

Another feature of advantage of the present invention has been that of cleaning the product, for in preparing products such as tuna, pieces of bone and cartilage are often imbedded in the material as it is delivered to the present machine. It has been found in operation that as the product is shredded this material becomes separated from the desired meat and becomes entangled in the reticulations of the wall 32 so that from time to time it is necessary to stop the machine and remove these undesirable splines which have not passed through the machine and will result in a detriment to the character and quality of the food product.

In operation of the machine from time to time the trays 18 are moved ahead as supported by the rollers and empty trays are placed in position to receive the shredded material.

It will thus be seen that the invention here disclosed embodies simple means for effectually shredding a product without changing the physical character of the product, the operation taking place in a simple automatic proceeding whereby a desirable high-grade product may be rapidly and efficiently prepared.

While I have shown the preferred means for carrying out my invention it is to be understood that various changes may be made in the combination, construction and arrangement of parts of the apparatus by those skilled in the art without departing from the spirit of the invention as claimed.

Having thus described my invention, what I claim and desire to secure by Letters Patent is:

1. A device of the character described comprising a sub-frame, tray supporting means thereupon, a frame carried thereabove, a shredding drum mounted upon said upper frame and having a wall of reticulated material, said material being formed of permanently bent sinuous strands of wire, which strands when in their woven state produce a uniformly undulated surface, a shaft extending longitudinally through said drum and being disposed eccentrically of the center of the drum, arms carried by the shaft, grid members carried by the arms, said grid members each comprising a plurality of laterally spaced bars extending longitudinally through the drum, and means for driving the shaft whereby the grid elements will rotate around the axis of the shaft and within the drum and will move toward and away from the drum wall as it travels therealong, whereby the grid members will contact the ridges of the undulated surface to cause a cutting action to occur between the drum and the grid.

2. A device of the character described comprising a sub-frame, tray supporting means thereupon, a frame carried thereabove, a shredding drum mounted upon said upper frame and having a wall of reticulated material, said material being formed of permanently bent sinuous strands of wire, which strands when in their woven state produce a uniformly undulated surface, a shaft extending longitudinally through said drum and being disposed eccentrically of the center of the drum, arms carried by the shaft, grid members carried by the arms, said grid members each comprising a plurality of laterally spaced bars extending longitudinally through the drum, said bars being spaced along an arc described from a center point eccentric to the rotating axis of the shaft and in a direction rearwardly of the radial plane of the grid supporting arms, whereby a tapered throat will be formed between the surface of the drum and the grid with the mouth of the throat in the direction of rotation of the shaft, and means for driving the shaft whereby the grid elements will rotate around the axis of the shaft, and within the drum and will move toward and away from the ridges of the undulated surface of the drum wall as it travels therealong.

3. A device of the character described comprising a sub-frame, tray supporting means thereupon, a frame carried thereabove, a shredding drum mounted upon said upper frame and having a wall of reticulated material, said material being formed of permanently bent sinuous strands of wire, which strands when in their woven state produce a uniformly undulated surface, a shaft extending longitudinally through said drum and being disposed eccentrically of the center of the drum, arms carried by the shaft, grid members carried by the arms, said grid members each comprising a plurality of laterally spaced bars extending longitudinally through the drum, means for driving the shaft whereby the grid elements will rotate around the axis of the shaft and within the drum and will move toward and away from the ridges of the undulated surface of the drum wall as it travels therealong, and a removable housing structure carried by said upper frame and enclosing said drum.

4. A device of the character described comprising a drum adapted to rotate upon its longitudinal axis, said drum having a cylindrical wall formed of reticulated material, said material being formed of permanently bent sinuous strands of wire which strands when in their woven state produce a uniformly undulated surface, a shaft extending longitudinally through said drum and being disposed eccentrically of the center of the drum, arms carried by the shaft, grid members carried by the arms, said grid members each comprising a plurality of laterally spaced bars extending longitudinally through the drum, means for diving the shaft to rotate the grid elements around the axis of the shaft and to move the same toward and away from the drum wall as it travels there along, said grid members and the drum wall cooperating to form a tapered throat between the two elements whereby material disposed between the elements will be shredded by the cutting action occurring between the grid elements and the ridges of the undulated surface of the drum wall as the grid elements are rotated.

5. A device of the character described comprising a drum adapted to rotate upon its longitudinal axis, said drum having a cylindrical wall formed of reticulated material, said material being formed of permanently bent sinuous strands of wire which strands when in their woven state produce a uniformly undulated surface and whereby circumferential sections of said wall are of different fineness of mesh, means for holding the drum in a desired rotated position to place a mesh of selected degree in operation, a shaft extending longitudinally through said drum and being disposed eccentrically of the center of the drum, arms carried by the shaft, grid members carried by the arms, said grid members each comprising a plurality of laterally spaced bars extending longitudinally through the drum, means for driving the shaft to rotate the grid members around the axis of the shaft and to move said grid members toward and away from the drum as it travels there around, said grid members and the drum wall cooperating to form a tapered throat between said elements whereby material disposed between the elements will be shredded by the cutting action between the grid element and the ridges of the undulated surface of the selected area of the drum wall.

6. A device of the character described comprising a drum adapted to rotate upon its longitudinal axis, said drum having a cylindrical wall formed of reticulated material, said material being formed of permanently bent sinuous strands of wire which strands when in their woven state produce a uniformly undulated surface and whereby circumferential sections of said wall are of different fineness of mesh, means for holding the drum in a desired rotated position to place a mesh of selected degree in operation, a shaft extending longitudinally through said drum and being disposed eccentrically of the center of the drum, arms carried by the shaft, grid members carried by the arms, said grid members each comprising a plurality of laterally spaced bars extending longitudinally through the drum, means for driving the shaft to rotate the grid members around the axis of the shaft and to move said grid members toward and away from the drum as it travels there around, said grid members and the drum wall cooperating to form a tapered throat between said elements whereby material disposed between the elements will be shredded by the cutting action between the grid element and the ridges of the undulated surface of the selected area of the drum wall whereby it will be reduced in its degree of fineness and may pass through the wall to be thereafter recovered.

7. A device of the character described comprising a drum adapted to rotate upon its longitudinal axis, said drum having a cylindrical wall formed of reticulated material, said material being formed of permanently bent sinuous strands of wire which strands when in their woven state produce a uniformly undulated surface and whereby circumferential sections of said wall are of different fineness of mesh, means for holding the drum in a desired rotated position to place a mesh of selected degree in operation, a shaft extending longitudinally through said drum and being disposed eccentrically of the center of the drum, arms carried by the shaft, grid members carried by the arms, said grid members each comprising a plurality of laterally spaced bars extending longitudinally through the drum, means for driving the shaft to rotate the grid members around the axis of the shaft and to move said grid members toward and away from the drum as it travels there around, said grid members and the drum wall cooperating to form a tapered throat between said elements whereby material disposed between the elements will be shredded by the cutting action between the grid element and the ridges of the undulated surface of the selected area of the drum wall whereby it will be reduced in its degree of fineness and may pass through the wall to be thereafter recovered, and a continuous conveyer belt passing beneath the drum for recovering said discharged material.

MARTIN QUAMMA.